Dec. 13, 1927.

L. C. COLE 1,652,426

TOOL TURRET FOR AXLE LATHES

Filed April 17, 1925

INVENTOR
L. C. Cole
BY
Joseph W. Schofield
ATTORNEY

Dec. 13, 1927.                                                                         1,652,426
L. C. COLE
TOOL TURRET FOR AXLE LATHES
Filed April 17, 1925                        2 Sheets-Sheet 2

INVENTOR
L.C.Cole
BY
Joseph V. Schofield
ATTORNEY

Patented Dec. 13, 1927.

1,652,426

UNITED STATES PATENT OFFICE.

LYNDON C. COLE, OF HAMILTON, OHIO, ASSIGNOR TO NILES-BEMENT-POND COMPANY, OF NEW YORK, N. Y., A CORPORATION OF NEW JERSEY.

TOOL TURRET FOR AXLE LATHES.

Application filed April 17, 1925. Serial No. 23,827.

This invention relates to tool turrets and in particular to a rotatable tool turret adapted to mount a plurality of individual cutting tools on opposite sides of the turret.

An object of the present invention is to provide a tool supporting turret having cutting tools arranged thereon in a manner permitting their removal in groups so that they may be ground in assembled position with simple mechanism and without impairing their form, relative position and adjustment.

Another object of the invention is to mount the individual cutting tools on blocks removably mounted upon the rotatable turret, these blocks being securely retained in position on the turret when in use and provided with adjustable clamping means for the tools.

One feature which enables me to accomplish the above objects is that I mount the cutting tools individually in oblique positions and in the manner permitting them to be raised or lowered relative to their supporting block member.

Another feature which is advantageous is that the cutting tools are always supported from their lower end surfaces and may be quickly and simultaneously ground by grinding their upper surfaces to a common plane in a surface grinding machine.

With these and other objects in view, my invention consists in the features of construction and operation set forth in the following specification and illustrated in the accompanying drawings.

In the accompanying drawings annexed hereto and forming a part of this specification, I have shown my invention embodied in a tool turret particularly adapted for axle turning lathes but it will be understood that the invention can be otherwise embodied and that the drawings are not to be construed as defining or limiting the scope of the invention, the claims appended to this specification being relied upon for that purpose.

Figure 1:
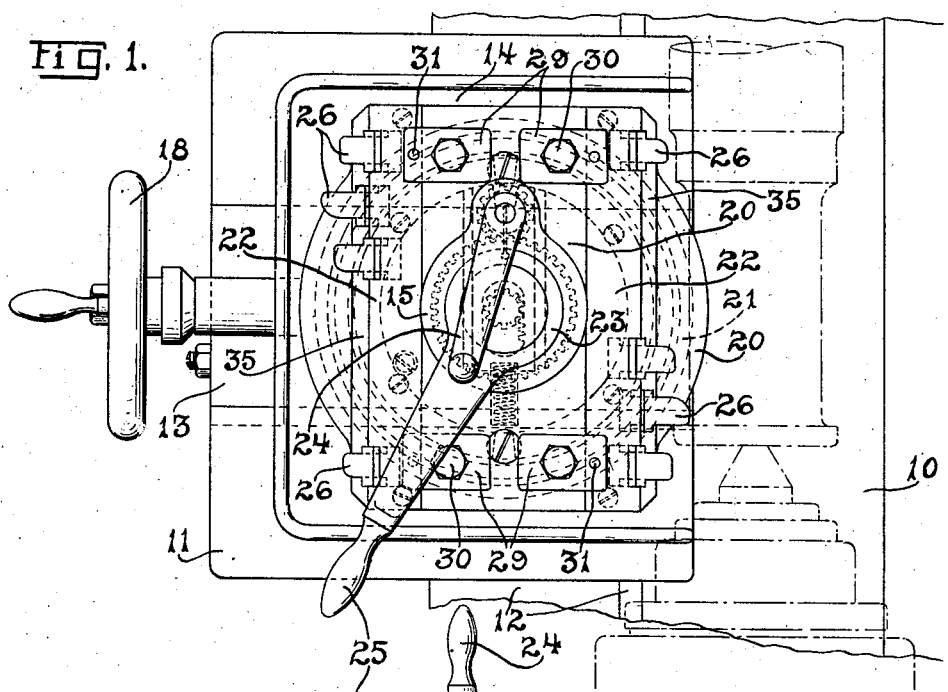
Figure 1 is a plan view of a complete turret having my invention applied thereto.

In the above mentioned drawings, I have shown but one embodiment of the invention which is now deemed preferable but it is to be understood that changes and modifications may be made within the scope of the appended claims without departing from the spirit of the invention.

Briefly, and in its broadest aspect, my invention comprises the following principal parts: first, a cross slide preferably adapted to be slidably mounted upon a tool carriage; second, a rotatable turret thereon; third, tool retaining blocks into which cutting tools may be individually positioned so that they may be adjusted and clamped; fourth, means to index the turret to move the cutting tools into and out of cutting positions; and fifth, means to rigidly but removably clamp the blocks holding the cutters in position during operation.

Referring more in detail to the figures of the drawings, I provide a machine base 10 indicated in the present invention as the body of an axle turning lathe. A tool carriage 11 is slidably mounted upon this base 10 preferably upon the ways 12 shown clearly in Fig. 2. The upper surface of the tool carriage 11 is provided with transversely extending ways 13 in which is adapted to slide a cross slide 14 on which is mounted the tool turret 15 and its attached parts.

Figure 2:
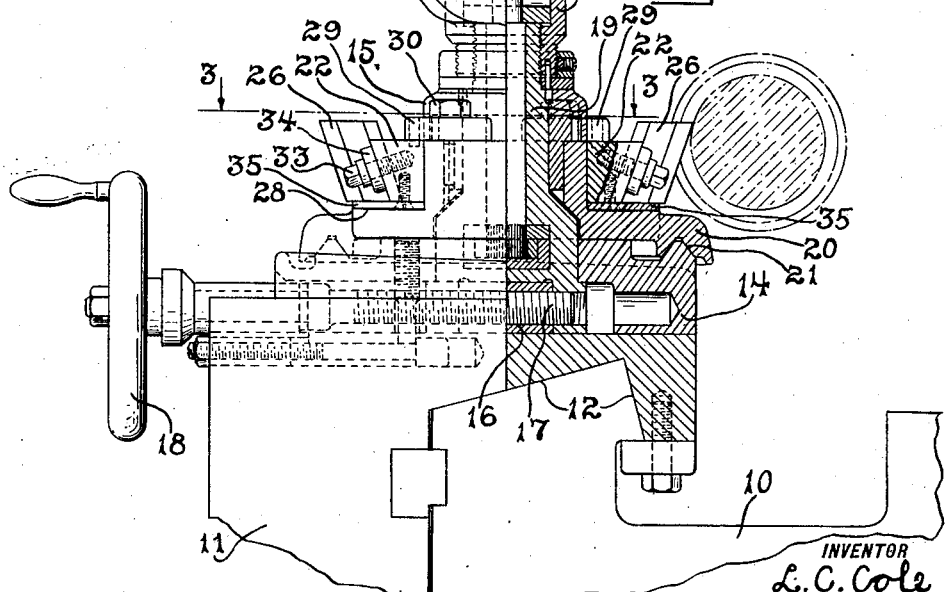
Fig. 2 is a side elevation partly in section showing the complete turret.
Figure 3:
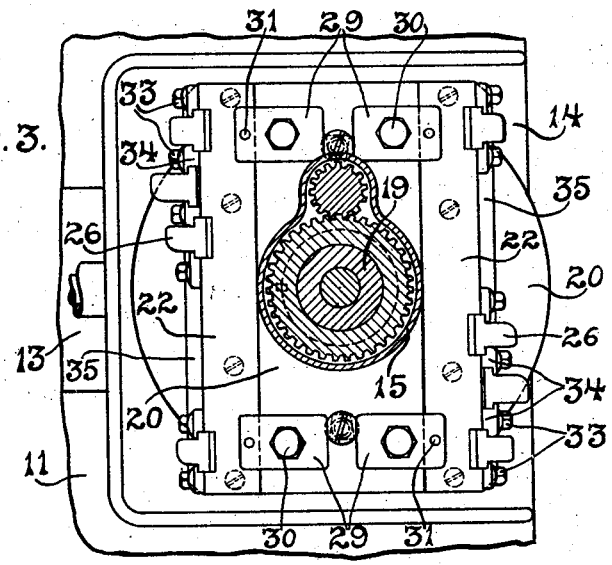
Fig. 3 is a plan view in section taken on line 3—3 of Fig. 2.

The cross slide 14, as shown in Fig. 2, is provided with a nut 16 engaged by a screw 17 rotatably mounted within the tool carriage 11. A hand wheel 18 on this screw 17 permits its rotation and therefore provides transverse movement for the cross slide 14. Also, as shown clearly in Fig. 2, a centrally disposed post 19 is provided, the cross slide 14 being engaged by the outside surface of this post 19. Resting on this cross slide 14 and surrounding the central post 19 is the rotatable turret 20 having a circular way 21 extending about its lower surface. This is adapted to contact with a corresponding projection formed centrally upon the upper surface of the cross slide 14. This turret 20 is surfaced to provide flat surfaces upon opposite sides on which may rest the tool supporting blocks 22. Above the upper surface of the turret 20 are locking and clamping means 23 so that the turret may be rigidly clamped in position. As these locking means and the clamping means may be similar to those now employed for these purposes they have not been specifically described or shown. To rotate the turret 20 to index the cutting tools the handle 24 is rotated, and to clamp or unclamp the turret 20 the handle 25 is rotated.

The supports on which are mounted the cutting tools 26 comprise removable blocks 22 positioned on opposite sides of the turret 20 so that the cutting tools 26 may be removed from the turret 20 while on the blocks 22. Other blocks 22 previously fitted with tools may then be positioned in their place. Attached to the lower surfaces of the blocks 22 are bearing plates 35 so that these plates 35 are removable with the blocks 22. The bearing plates 35 engage horizontal surfaces formed directly on the turret 20 and are forced by their clamping means against vertical side walls of the turret 20. These removable blocks 22 are in the form of strips resting upon the upper surfaces of the bearing plates 35 and held in place by clamps 29 disposed near the ends of the strips 22 and engaging their upper surface. These clamps 29 are fastened to the rotating part of the turret 20 by screws 30. To further aid in holding these removable parts 22 on the turret 20, pins 31 in the clamps 29 engage recesses formed in the removable blocks 22.

Figure 4:
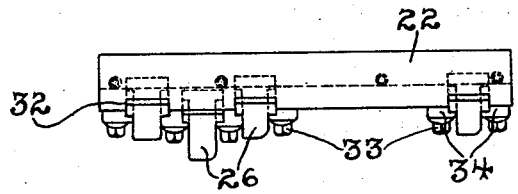
Fig. 4 is a separate view of the tool holding block and individual cutting tools showing their method of adjustment.
Figure 5:
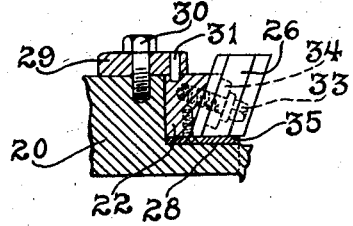
Fig. 5 is a side view in section of the parts shown in Fig. 4, a part of the turret being also shown.

The removable plates or blocks 22 on their outer and preferably oblique surfaces are provided with recesses 32 into which the cutting tools 26 may be placed. These cutting tools 26 may be clamped adjustably to the removable block 22 by clamping screws 33 shown in Figs. 4 and 5. Preferably clamping washers 34 are provided under the heads of the screws 33 fitting over the lateral projections of the cutting tools 26. One of these screws 33 and washers 34 is provided on each side of the individual cutting tools 26.

It will be seen from this construction of the cutting tools 26 and their retaining blocks 22 that each of the cutting tools 26 is individually adjustable obliquely in a vertical plane. In all positions they may be supported on their lower surfaces by engagement directly with a bearing plate 35 or upon inserts or "shims" placed between the lower surface of the cutting tools 26 and this bearing plate 35. Also the blocks 22 holding the cutting tools 26 may readily be removed from the turret 20 when the tools 26 become dulled and require re-sharpening or dressing. In order to sharpen the cutting tools 26, it is only necessary to grind off a portion of their flat upper surfaces and, for convenience, I preliminarily form each of the cutting tools 26 so that it will be in proper relative position to each of the other tools on the same block 22 for any specified operation when the upper surfaces of each of the tools 26 is in the same plane. It is therefore a simple matter to retain this preliminary adjustment as each of the cutting tools may be ground off in a surface grinding machine while still retained in its turret block 22 and each upper surface of the cutting tools 26 simultaneously ground away an equal amount so that their upper surfaces will remain in a common plane. If certain of the cutting tools wear more rapidly than others, these may be adjusted slightly to an elevated position before the grinding or sharpening operation.

What I claim is:

1. A tool turret for lathes comprising in combination, a rotatable member, means to lock said member in indexed positions, a tool retaining block positioned directly against and extending parallelly to a side of said rotatable member and detachably clamped thereto on its lower surface in a fixed position, a plate attached thereto, cutting tools mounted upon an oblique outer surface of said block and bearing upon said plate, and clamping means for said tools permitting adjustability in a vertical plane whereby said tools may be adjusted upwardly as worn.

2. A tool turret for lathes comprising in combination, a rotatable member, means to lock said member in indexed positions, a tool retaining block detachably positioned thereon and having inclined recesses provided therein, bearing surfaces for said block on said rotatable member disposed at right angles to each other, clamping means for said block, cutting tools adjustable within said recesses in said block, and individual clamping means for securing said tools in any adjusted position.

3. A tool turret for lathes comprising in combination, a rotatable member, means to lock said member in indexed positions, opposed tool retaining blocks detachably positioned thereon on opposite sides of said turret and having recesses provided therein, bearing surfaces for said block on said rotatable member disposed at right angles to each other, clamping strips having pins adapted to enter recesses in said blocks and means to secure said clamping strips to said rotatable member, cutting tools adjustable within said recesses, and clamping means for said tools in any adjusted position.

4. A tool turret for lathes comprising in combination, a rotatable member, means to lock said member in indexed positions, a tool retaining block positioned directly against and extending parallelly to a side of said rotatable member and detachably clamped thereto in a fixed position, a bearing plate attached to the retaining block on its lower surface, cutting tools mounted upon an oblique outer surface of said block and bearing upon said plate, and clamping means for said tools permitting adjustability in a vertical plane whereby said tools may be adjusted upwardly as worn.

In testimony whereof I hereto affix my signature.

LYNDON C. COLE.